A. Rottanzi,
Drinking Cup.
N° 79,689.   Patented July 7, 1868.
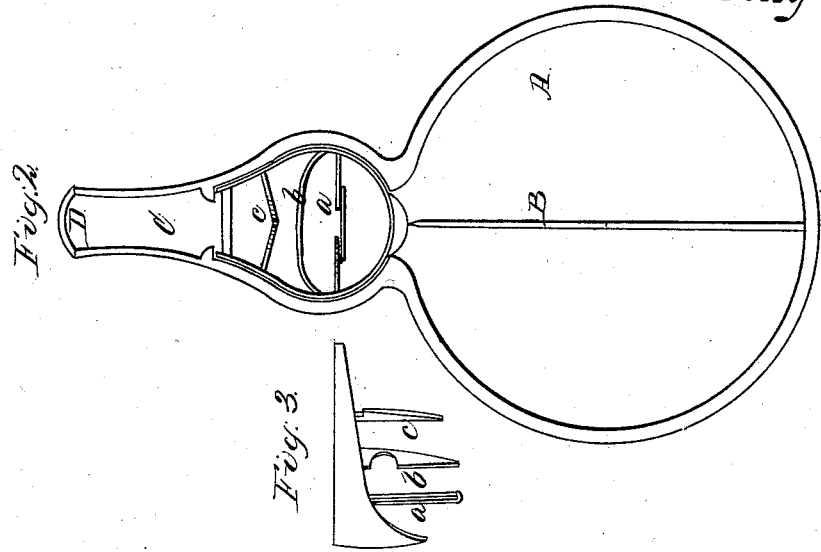
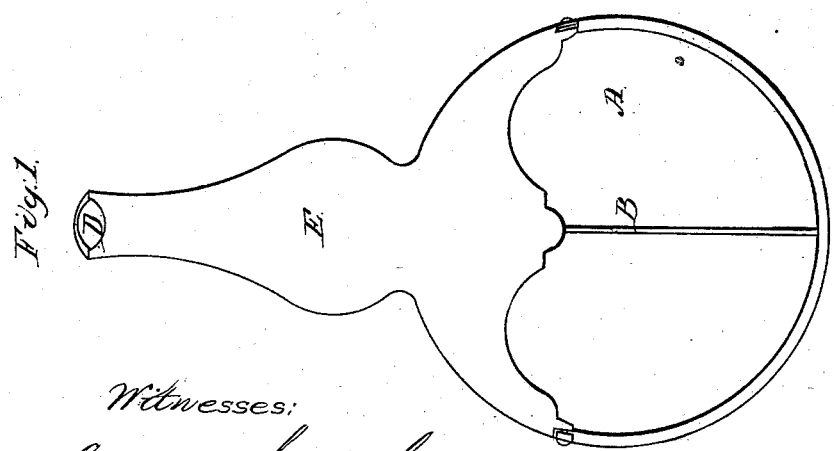
Witnesses:
C. W. M. Smith
J. L. Boone.
Inventor:
A. Rottanzi

United States Patent Office.

ANTONIO ROTTANZI, M. D., OF SAN FRANCISCO, CALIFORNIA.

Letters Patent No. 79,689, dated July 7, 1868.

IMPROVED CUP FOR EFFERVESCING-DRINKS.

*The Schedule referred to in these Letters Patent and making part of the same.*

TO ALL WHOM IT MAY CONCERN:

Be it known that I, ANTONIO ROTTANZI, M. D., of the city and county of San Francisco, State of California, have invented an Improved Cup for Effervescing-Drinks; and I do hereby declare the following description and accompanying drawings are sufficient to enable any person skilled in the art or science to which it most nearly appertains to make and use my said invention or improvements without further invention or experiment.

The nature of my invention is to provide a cup to be used for effervescing-drinks, such as results when Seidlitz-powders are used, and the object of my invention is to so arrange the cup that the two powders are contained in two separate compartments of the vessel, from which they may be poured simultaneously into a spout, where they meet, and effervescence takes place, while it may be drank from the mouth-piece, thus preventing the gas, resulting from the effervescence, from escaping, and regulating the amount of the solution desired to be taken, as, when sufficient has been taken, the remainder may be allowed to remain in their respective compartments, to be used at another time.

My invention also relates to a device for more thoroughly mixing and incorporating the fluids when they have met in the spout, and consists of a series of stops or gates placed in the neck of the spout in any suitable position for arresting the flow of the mixture.

To more fully explain my invention, reference is had to the accompanying drawings, and the letters marked thereon, forming a part of this specification, of which—

Figure 1 is a plan of my cup.

Figure 2 is a plan of my cup with cover removed.

Figure 3 is a view of the gates or stops.

A is a cup or bowl, made of any suitable material, of the ordinary outward construction, having a partition or diaphragm, B, passing through its centre, and dividing it into two equal compartments. A spout, C, extends from the body of the cup, and is so placed that the partition B divides the opening leading into the spout C into two parts, so that the solutions from the two compartments will flow simultaneously into it.

A series of stops or gates, a b c, is placed in the body of the spout C, for the purpose of arresting the flow of the mixture, and causing them to more fully incorporate. This series of stops or gates may be augmented when it is desired to have the mixture flow less freely, or diminished, if desired, otherwise, or they may be entirely removed, in which case a less amount of gas will be generated in the spout.

The spout is furnished with a mouth-piece, D, from which the mixture may be drank, and a lid or cover, E, may be hinged to the cup, so as to fall down and cover the spout and a portion of the cup, so as to prevent the mixture from overflowing from too great effervescence. This lid is also useful for increasing the number of or removing the gates.

When the cup is made of glass or other fragile material, the lid may be permanently fastened to the cup and spout, the number of gates in that case being regulated in their manufacture.

The cup may be provided with a handle to render it convenient, and lines may be made around the inner circumference of the cup, on each side of the partition, the lines being at equal height, so as to indicate the amount of water to be placed in each compartment, so that the two solutions will be exhausted at the same time.

By this construction, I have a cup from which effervescing or gaseous fluids of all kinds may be drank without allowing the gas to escape, thus rendering the drink inefficacious, while the flow and amount of gas desired may be easily regulated.

Having thus described my invention, what I claim, and desire to secure by Letters Patent, is—

In combination with the partition B, the stops or gates a b c, or equivalent device, and the lid or cover E, substantially as and for the purpose described.

In witness whereof, I have hereunto set my hand and seal.

A. ROTTANZI, M. D. [L. S.]

Witnesses:
J. L. BOONE,
GEO. H. STRONG.